(12) United States Patent
Fukushima

(10) Patent No.: US 6,951,223 B2
(45) Date of Patent: *Oct. 4, 2005

(54) CLEANING LIQUID SUPPLY SYSTEM HAVING PUMPS CONNECTED TO TANK

(75) Inventor: Tsuneo Fukushima, Kariya (JP)

(73) Assignee: Asmo Co., Ltd., Shizuoka (JP)

( * ) Notice: Subject to any disclaimer, the term of this patent is extended or adjusted under 35 U.S.C. 154(b) by 322 days.

This patent is subject to a terminal disclaimer.

(21) Appl. No.: 10/261,777

(22) Filed: Oct. 2, 2002

(65) Prior Publication Data
US 2003/0075207 A1 Apr. 24, 2003

(30) Foreign Application Priority Data

Oct. 17, 2001 (JP) .......................................... 2001-318804
Dec. 19, 2001 (JP) .......................................... 2001-386705

(51) Int. Cl.⁷ .............................. B08B 3/02; B05B 1/10
(52) U.S. Cl. ..................... 134/186; 134/198; 239/284.2
(58) Field of Search ................................ 134/123, 172, 134/174, 191, 193, 198; 15/250.002, 250.01, 250.02; 239/284.1, 284.2

(56) References Cited

U.S. PATENT DOCUMENTS

| | | | | |
|---|---|---|---|---|
| 3,902,217 A | * | 9/1975 | Botz et al. ................ | 15/250.02 |
| 3,913,840 A | * | 10/1975 | Kato ........................ | 239/284.2 |
| 4,177,928 A | * | 12/1979 | Bergkvist ................ | 239/284.2 |
| 4,618,096 A | * | 10/1986 | Kondo et al. ............... | 239/101 |
| 4,919,591 A | | 4/1990 | Kamimura et al. | |
| 5,012,977 A | * | 5/1991 | Karklins et al. ......... | 239/284.1 |
| 5,657,929 A | * | 8/1997 | DeWitt et al. ........... | 239/284.2 |
| 6,669,110 B2 | * | 12/2003 | Fukushima ............... | 239/284.2 |
| 2003/0222156 A1 | * | 12/2003 | Bissonnette .............. | 239/284.1 |

FOREIGN PATENT DOCUMENTS

JP U-4-95859 8/1992

\* cited by examiner

Primary Examiner—Joseph L Perrin
(74) Attorney, Agent, or Firm—Posz Law Group, PLC

(57) ABSTRACT

One of two outlet openings of a compact pump and one of two outlet openings of another compact pump are communicated with a supply opening of each headlamp nozzle such that cleaning liquid discharged from the one of the two outlet openings of the compact pump is supplied to the supply opening of each headlamp nozzle, and cleaning liquid discharged from the one of the two outlet openings of the other compact pump is supplied to the supplied opening of each headlamp nozzle.

7 Claims, 8 Drawing Sheets

CLEANING LIQUID SUPPLY SYSTEM HAVING PUMPS CONNECTED TO TANK

CROSS REFERENCE TO RELATED APPLICATION

This application is based on and incorporates herein by reference Japanese Patent Application No. 2001-318804 filed on Oct. 17, 2001 and Japanese Patent Application No. 2001-386705 filed on Dec. 19, 2001.

BACKGROUND OF THE INVENTION

1. Field of the Invention

The present invention relates to a cleaning liquid supply system, which supplies cleaning liquid to a front glass, headlamps and a rear glass of a vehicle to clean them.

2. Description of Related Art

Generally, raindrops and dirt adhered to each of a front glass and a rear glass of a vehicle are wiped off from each glass in the following manner. That is, cleaning liquid is first discharged to each glass from a cleaning liquid supply system, and then a corresponding wiper device wipes the raindrops, the dirt and the cleaning liquid to remove them from the glass.

Thus, a pump apparatus of the cleaning liquid supply system has been used as an auxiliary apparatus of the corresponding wiper device, so that even when the pump apparatus has a relatively small discharge amount and a relatively small output power, the pump apparatus can supply enough cleaning liquid to wash the corresponding glass.

In a case of a headlamp cleaner, is difficult to provide a space for accommodating a corresponding wiper device around each headlamp. Thus, dirt and stains adhered to the corresponding headlamp are removed only through discharge of cleaning liquid, which is supplied from the cleaning liquid supply system, to the corresponding headlamp (without using a wiper device to wipe the corresponding headlamp). As a result, the headlamp cleaner requires a relatively large pump, which can discharge the cleaning liquid at a relatively large discharge amount and a relatively high discharge pressure (relatively large output power). Therefore, the headlamp cleaner normally includes the relatively large dedicated pump, which is different from the pump of the cleaning liquid supply system used for cleaning the front glass and/or the rear glass. This causes the following disadvantages. That is, an installable location of the relatively large pump to a corresponding cleaning liquid tank is limited, and the relatively large pump causes an increase in an entire weight of the system. Furthermore, the relatively large pump needs to be provided separately from the pump of the cleaning liquid supply system used for cleaning the front glass and/or the rear glass. In other words, the pump of the cleaning liquid supply system used for cleaning the front glass and/or the rear glass cannot be commonly used for supplying the cleaning liquid to the headlamps, resulting in relatively low versatility of the pumps. This causes an increase in the manufacturing cost.

Furthermore, the cleaning liquid supply system for supplying the cleaning liquid to the front glass is normally provided in every vehicle and is thus produced through mass production. On the other hand, the cleaning liquid supply system for supplying the cleaning liquid to the headlamps is only provided in luxury automobiles or is provided as an optional device available for some automobiles. Thus, the pump of the cleaning liquid supply system for supplying the cleaning liquid to the headlamps is produced in a relatively small amount.

Therefore, the pump used in the cleaning liquid supply system for supplying the cleaning liquid to the headlamps is the dedicated pump and is produced in the relatively small amount, resulting in low versatility of the pump and an increase in the manufacturing cost.

SUMMARY OF THE INVENTION

The present invention addresses the above disadvantages. Thus, it is an objective of the present invention to provide a cleaning liquid supply system, which allows achievement of a sufficient discharge pressure of cleaning liquid at a headlamp nozzle and also allows a reduction of its manufacturing cost.

To achieve the objective of the present invention, there is provided a cleaning liquid supply system for a vehicle. The cleaning liquid supply system includes a tank, a headlamp nozzle, and a pump apparatus. The tank stores cleaning liquid. The headlamp nozzle receives the cleaning liquid from the tank and discharges the cleaning liquid to a corresponding headlamp of the vehicle. The pump apparatus is connected to the tank and the headlamp nozzle and pumps the cleaning liquid supplied from the tank to the headlamp nozzle. The headlamp nozzle includes a supply opening, through which the cleaning liquid is supplied to the headlamp nozzle from the pump apparatus. The pump apparatus includes a first compact pump and a second compact pump. The first compact pump includes an inlet opening for taking the cleaning liquid and at least one outlet opening for discharging the cleaning liquid. The second compact pump includes an inlet opening for taking the cleaning liquid and at least one outlet opening for discharging the cleaning liquid. One of the at least one outlet opening of the first compact pump and one of the at least one outlet opening of the second compact pump are communicated with the supply opening of the headlamp nozzle such that the cleaning liquid discharged from the one of the at least one outlet opening of the first compact pump is supplied to the supply opening of the headlamp nozzle. The cleaning liquid discharged from the one of the at least one outlet opening of the second compact pump is supplied to the supply opening of the headlamp nozzle.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A cleaning liquid supply system according to a first embodiment of the present invention will be described with reference to FIGS. 1 to 7.

Figure 1:
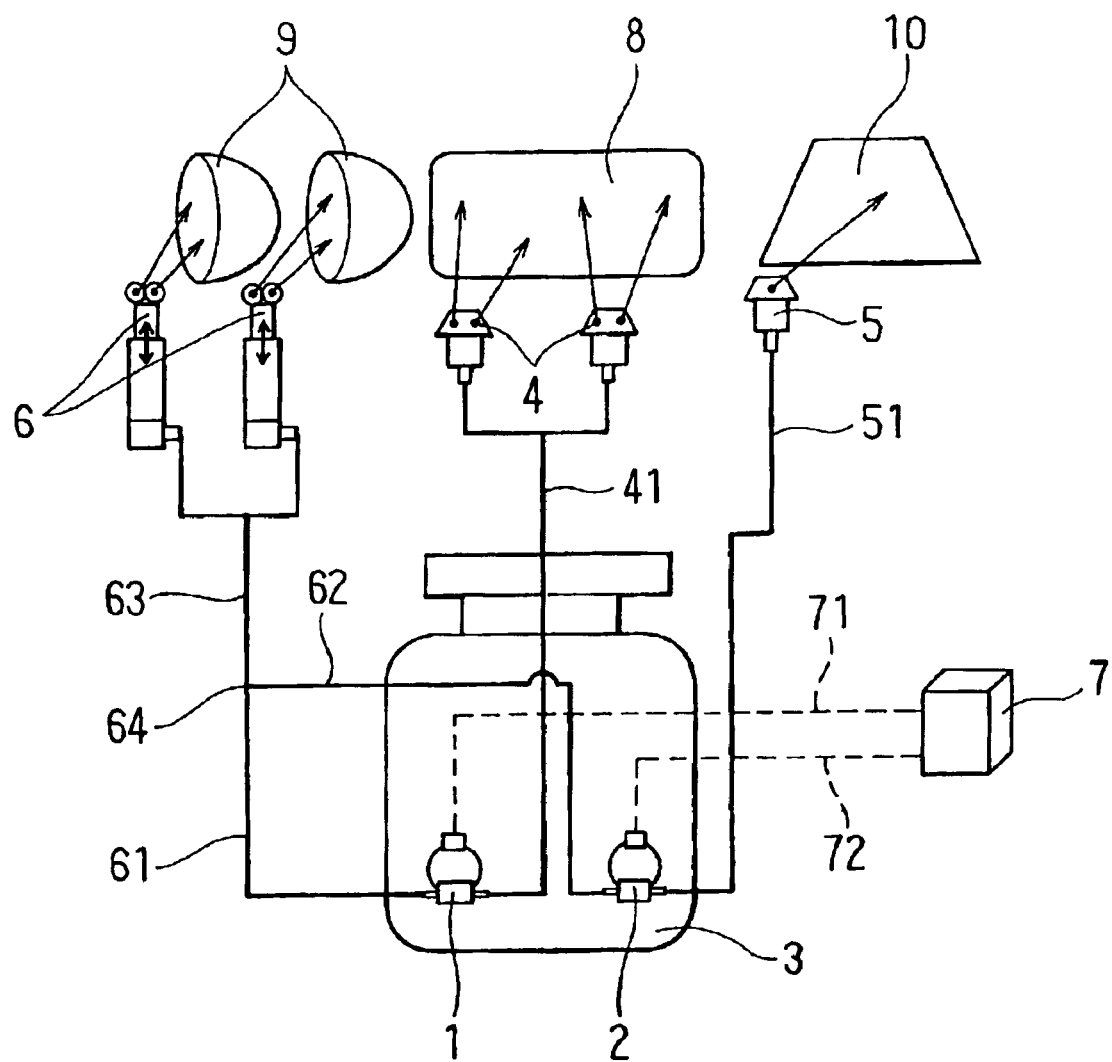
FIG. 1 is a schematic view showing an entire structure of a cleaning liquid supply system according to a first embodiment of the present invention.

With reference to FIG. 1, the cleaning liquid supply system of a vehicle includes a controller 7, a cleaning liquid tank 3, a couple of compact pumps (serving as a pump apparatus of the present invention) 1, 2, left and right front nozzles 4, left and right headlamp nozzles 6 and a rear nozzle 5.

Figure 2:
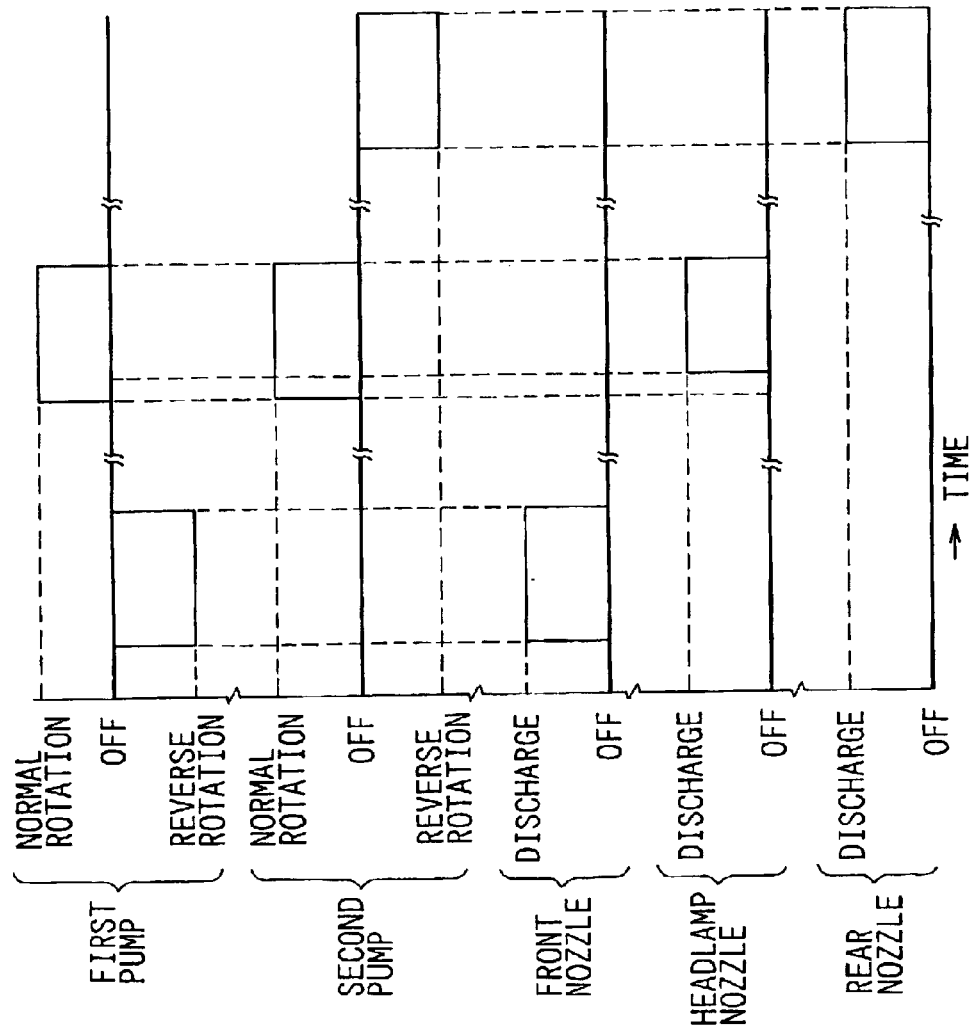
FIG. 2 is a timing chart showing operation of the cleaning liquid supply system according to the first embodiment.
Figure 3:
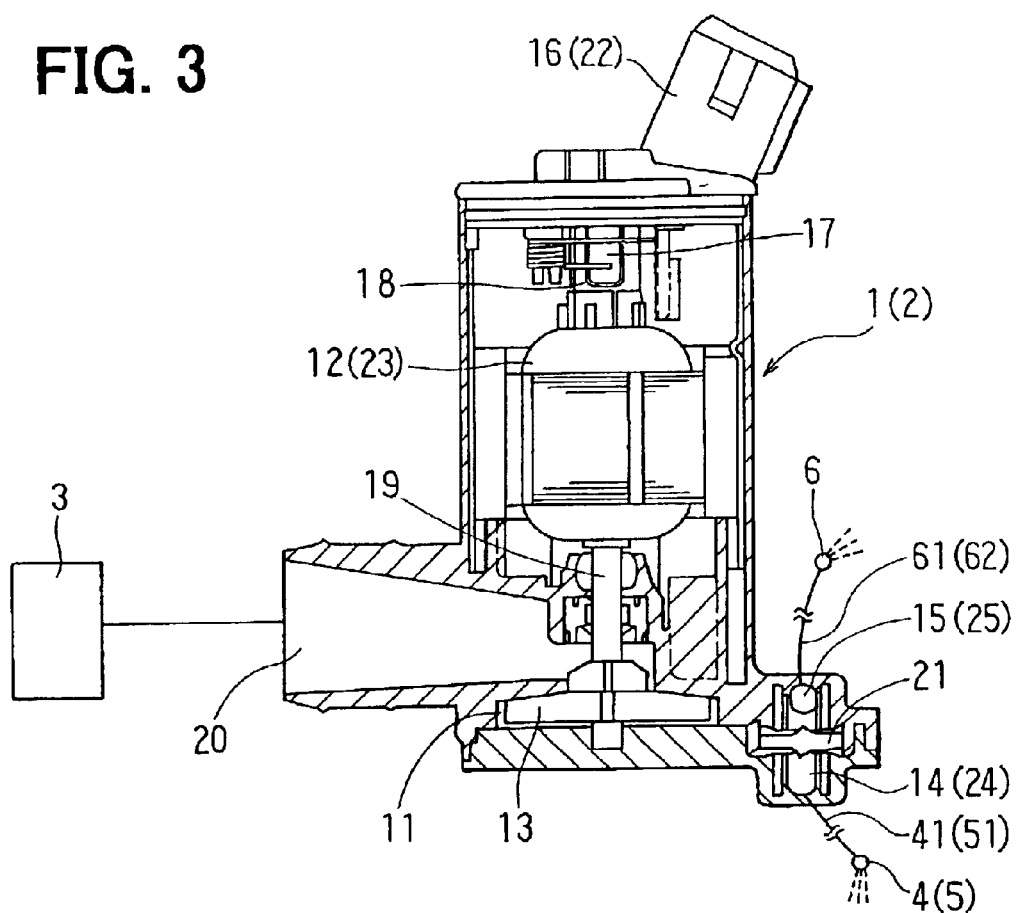
FIG. 3 is a cross-sectional view of a compact pump of the cleaning liquid supply system of the first embodiment.
Figure 4:
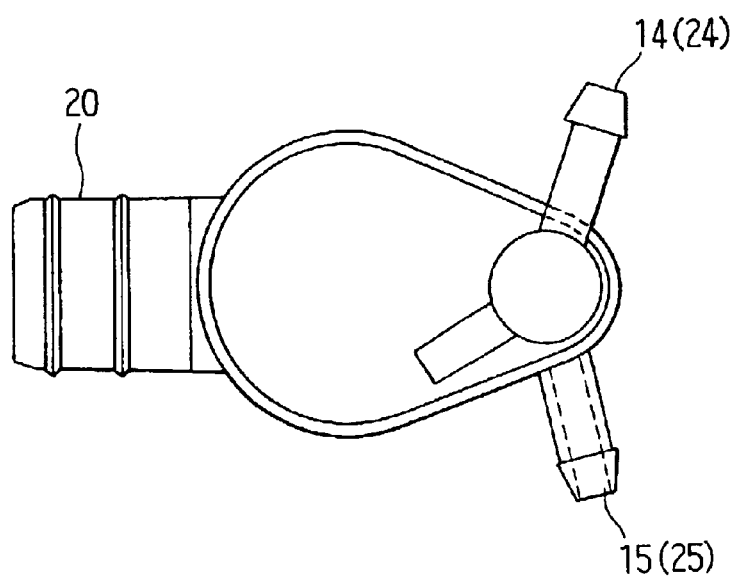
FIG. 4 is a bottom view of the compact pump shown in FIG. 3.

With reference to FIGS. 1 and 3, the controller 7 is connected to a connector 16 of the compact pump 1 through an electrical line 71 and is also connected to a connector 22 of the compact pump 2 through an electrical line 72. When a corresponding switch (not shown) is operated by a driver, the compact pumps 1, 2 are driven in a manner shown in a timing chart of FIG. 2.

The tank 3 is secured to a vehicle body and stores cleaning liquid to be discharged from the front nozzles 4, the headlamp nozzles 6 and the rear nozzle 5. An inlet opening 20 of each compact pump 1, 2 is inserted and secured in the tank 3 near a base of the tank 3 through a seal member, such as a grommet.

With reference to FIGS. 1 and 3, the controller 7 is connected to the connector 16 of the compact pump 1 through the electrical line 71, and a motor 12 of the compact pump 1 is controlled by the controller 7 to rotate in a normal direction or a reverse direction upon supply of electric power to a winding of the motor 12 from brushes 17 through a commutator 18. In the compact pump 1, when the motor 12 is rotated, an impeller 13 secured to a motor drive shaft 19 is rotated in the normal direction or the reverse direction, so that the cleaning liquid received in the tank 3 is suctioned into a pump chamber 11 through the inlet opening 20.

When the impeller 13 is rotated in the normal direction, the cleaning liquid in the pump chamber 11 is pressurized to increase a discharge pressure of the cleaning liquid. The increased discharge pressure of the cleaning liquid in the pump chamber 11 causes a float valve 21 to close a first outlet opening 14, so that the cleaning liquid is discharged to a hose 61 through a second outlet opening 15.

On the other hand, when the impeller 13 is rotated in the reverse direction, the cleaning liquid, which is pressurized by the impeller 13, causes the float valve 21 to close the second outlet opening 15, so that the cleaning liquid is discharged to a hose 41 through the first outlet opening 14.

As described above, in the compact pump 1, the operational direction of the float valve 21 is changed by the discharge pressure based on the rotational direction of the motor 12 to switch the outlet of the compact pump 1 between the first outlet opening 14 and the second outlet opening 15.

Next, the compact pump 2 will be described. However, it should be noted that a structure of the compact pump 2 is substantially the same as that of the compact pump 1, as shown in FIG. 3, so that details of the compact pump 2 will not be described for the sake of simplicity. Similar to the compact pump 1, when a motor 23 of the compact pump 2 is rotated by the controller 7 in the normal direction, the cleaning liquid is discharged to a hose 62 through a second outlet opening 25. When the motor 23 is rotated in the reverse direction, the cleaning liquid is discharged to a hose 51 through a first outlet opening 24.

The cleaning liquid, which is discharged from the compact pump 1 to the hose 41, is supplied to the left and right front nozzles 4 and is discharged from the front nozzles 4 to the front glass 8. Furthermore, the cleaning liquid, which is discharged from the compact pump 2 to the hose 51, is discharged from the rear nozzle 5 to the rear glass 10.

Figure 7:
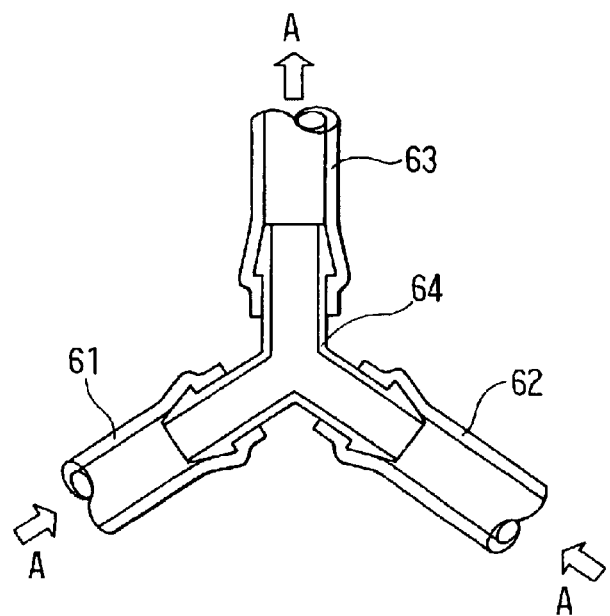
FIG. 7 is a cross-sectional view showing a joint of the cleaning liquid supply system according to the first embodiment.

With reference to FIG. 7, the cleaning liquid, which is discharged from the compact pump 1 to the hose 61, and the cleaning liquid, which is discharged from the compact pump 2 to the hose 62, are merged through a joint 64 and are supplied to a hose 63. The cleaning liquid in the hose 63 is supplied to the left and right headlamp nozzles 6 and is discharged from the left and right headlamp nozzles 6 to the left and right headlamps 9.

Figure 5:
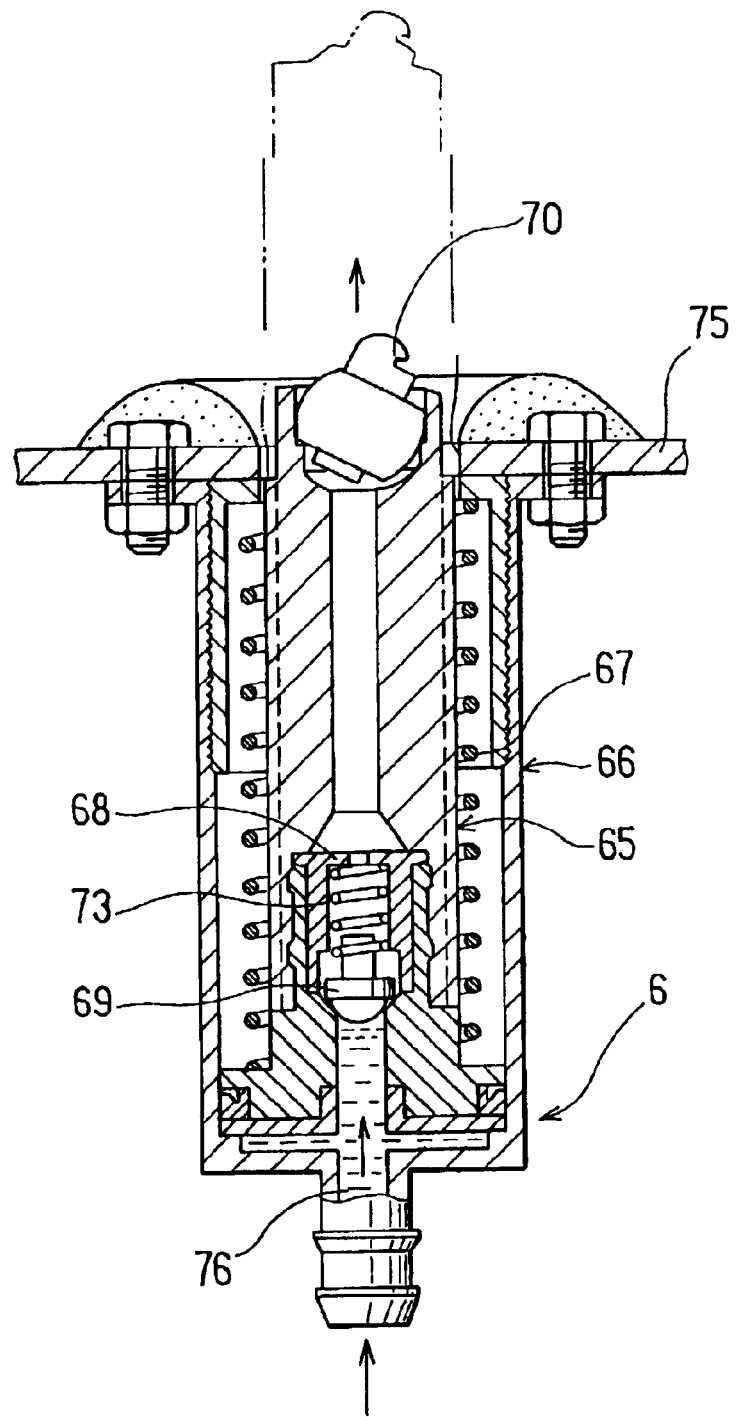
FIG. 5 is a cross-sectional view showing a headlamp nozzle of the cleaning liquid supply system placed in a retracted position.
Figure 6:
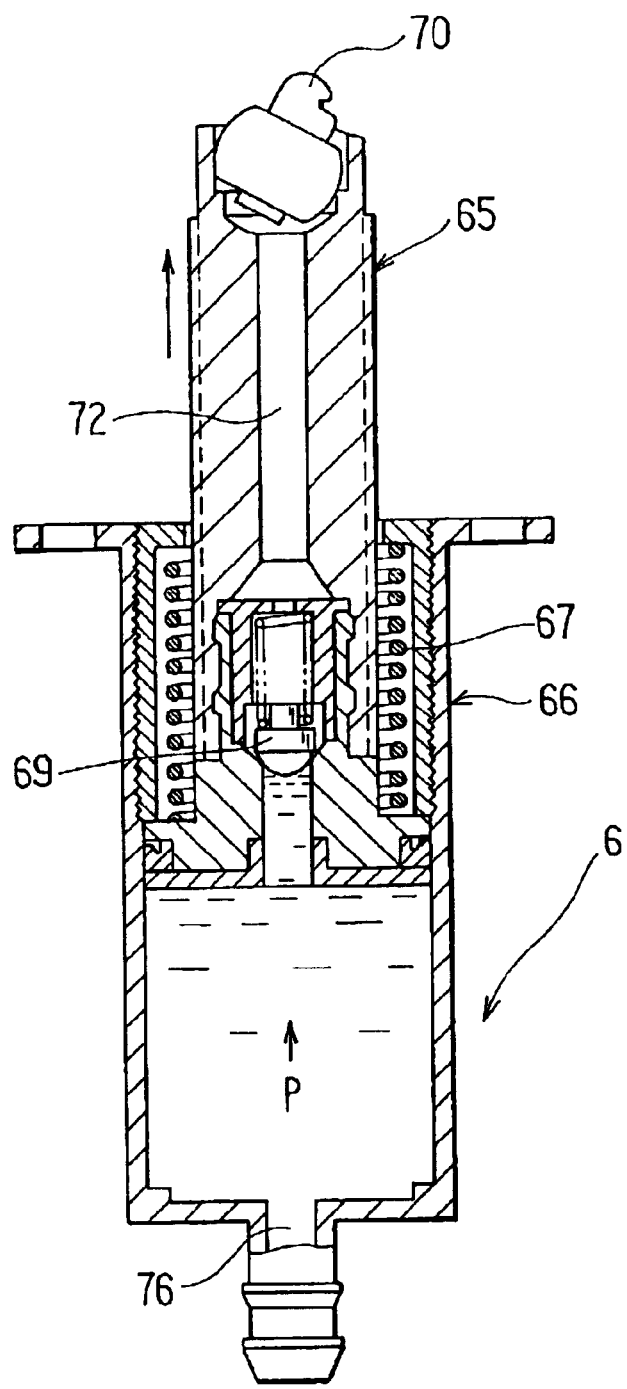
FIG. 6 is a cross-sectional view showing the headlamp nozzle of the cleaning liquid supply system placed in a discharge position.

With reference to FIGS. 5 and 6, each headlamp nozzle 6 has a discharge nozzle 70. The discharge nozzle 70 can extend and retract relative to a cylinder 66, which is secured to a front bumper 75 of the vehicle. When the cleaning liquid is supplied to a supply opening 76 through the hose 63, a piston 65, which is slidably received in the cylinder 66, is extended by a pressure P of the cleaning liquid supplied to the supply opening 76 to a height, at which the cleaning liquid is appropriately discharged to the corresponding headlamp 9 through the discharge opening 70, as shown in FIG. 6. After the piston 65 is extended, a shut off valve 69, which is axially, slidably received in a guide 68, is lifted or opened by a pressure P1 (not shown) of the cleaning liquid. Thus, the cleaning liquid is discharged to the corresponding headlamp 9 from the discharge opening 70 through a flow passage 72 provided in the piston 65. The piston 65 needs to be extended before the cleaning liquid is discharged from the discharge opening 70. Thus, a time period for extending the piston 65 should be provided before the discharge of the cleaning liquid from the discharge opening 70. In order to provide this time period, an urging force of a spring 67, which urges the piston 65 toward a retracted position of the piston 65, and an urging force of a spring 73, which urges the shut off valve 69 toward a closed position of the shut off valve 69, are selected such that the cleaning liquid is discharged from the discharge opening 70 after a certain time period has elapsed since time of actuating the first and second compact pumps 1, 2, as shown in FIG. 2. Thus, the shut off valve 69 is opened by the pressure P1 of the cleaning liquid, which is greater than the pressure P of the cleaning liquid for extending the piston 65.

When the discharge of the cleaning liquid through the discharge opening 70 ends, the first and second compact pumps 1, 2 are stopped, so that the pressure P of the cleaning liquid no longer exists, and thus the piston 65 is returned by the urging force of the spring 67 to the retracted position of the piston 65, as shown in FIG. 5. At this time, the cleaning liquid in the cylinder 66 is returned to the cleaning liquid tank 3 by the piston 65 through the hoses 63, 62, 61 and the pump chambers 11 of the first and second compact pumps 1, 2.

As described above, the cleaning liquid supply system of the first embodiment includes the compact pump 1, which supplies the cleaning liquid to the front glass 8 and is relatively compact, light weight and versatile, and the compact pump 2, which is relatively compact, light weight and versatile like the compact pump 1. The cleaning liquid, which is discharged from the compact pump 1, and the cleaning liquid, which is discharged from the compact pump 2, are merged to discharge the cleaning liquid at the relatively large discharge amount and the relatively high discharge pressure. In this way, there is no need to provide a relatively large dedicated pump for cleaning of the headlamps 9. Furthermore, the compact pump, which is used for cleaning the front glass 8, can be used for cleaning of the headlamps 9. Thus, the pumps 1, 2 of the cleaning liquid supply system are relatively compact, light weight and versatile, so that the cleaning liquid supply system can be provided at a relatively low cost.

Furthermore, the compact pump 1 and the compact pump 2, which are secured in the tank 3 near the base of the tank 3, are substantially identical to each other, and each of the compact pump 1 and the compact pump 2 has the two outlet openings for discharging the cleaning liquid to supply the cleaning liquid to the front nozzles 4, the headlamp nozzles 6 and the rear nozzles 5. The cleaning liquid is discharged from one of the two outlet openings of the pump 1, 2 depending on the rotational direction (e.g., the normal direction or reverse direction) of the corresponding motor 12, 23. Furthermore, as described above, the compact pump 1 and the compact pump 2 are relatively compact and light weight, so that both the compact pump 1 and the compact pump 2 can be installed to the single tank 3. In this way, the cleaning liquid to be supplied to the front nozzles 4, the cleaning liquid to be supplied to the headlamp nozzles 6 and the cleaning liquid to be supplied to the rear nozzle 5 do not need to be received in separate tanks and can be received in the single tank 3. Thus, the tank 3 is placed at only one location in the vehicle, and thus the tank accommodating space can be reduced, allowing a reduction in a size of the entire system.

Furthermore, each headlamp nozzle 6 has the extendable structure. Even though the compact pumps 1, 2 are used, each headlamp nozzle 6 can be extended by the relatively high discharge pressure of the merged cleaning liquid, which is supplied from both the first and second compact pumps 1, 2, to the height for appropriately discharging the cleaning liquid to the corresponding headlamp 9, and the cleaning liquid can be discharged from the discharge opening 70 of to the corresponding headlamp 9.

(Second Embodiment)

A cleaning liquid supply system according to a second embodiment of the present invention will be described with reference to FIGS. 8, 9, 11 and 12.

Figure 8:
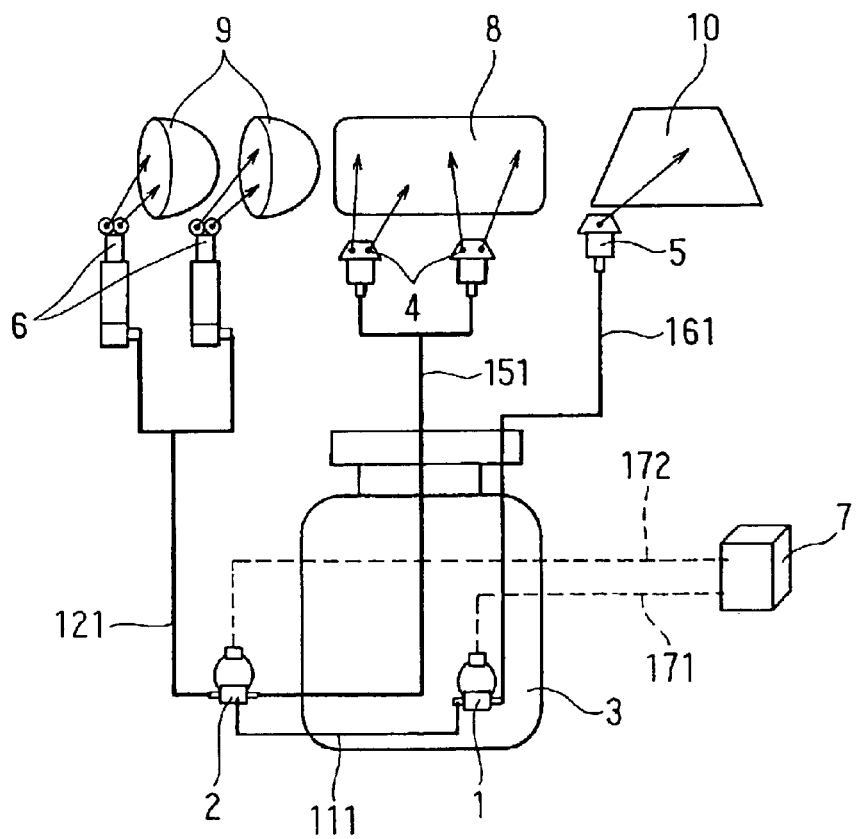
FIG. 8 is a schematic view showing an entire structure of a cleaning liquid supply system according to a second embodiment of the present invention.

With reference to FIG. 8, the cleaning liquid supply system of a vehicle includes a controller 7, a cleaning liquid tank 3, a couple of compact pumps (serving as a pump apparatus of the present invention) 1, 2, left and right headlamp nozzles 6, left and right front nozzles 4 and a rear nozzle 5.

Figure 11:
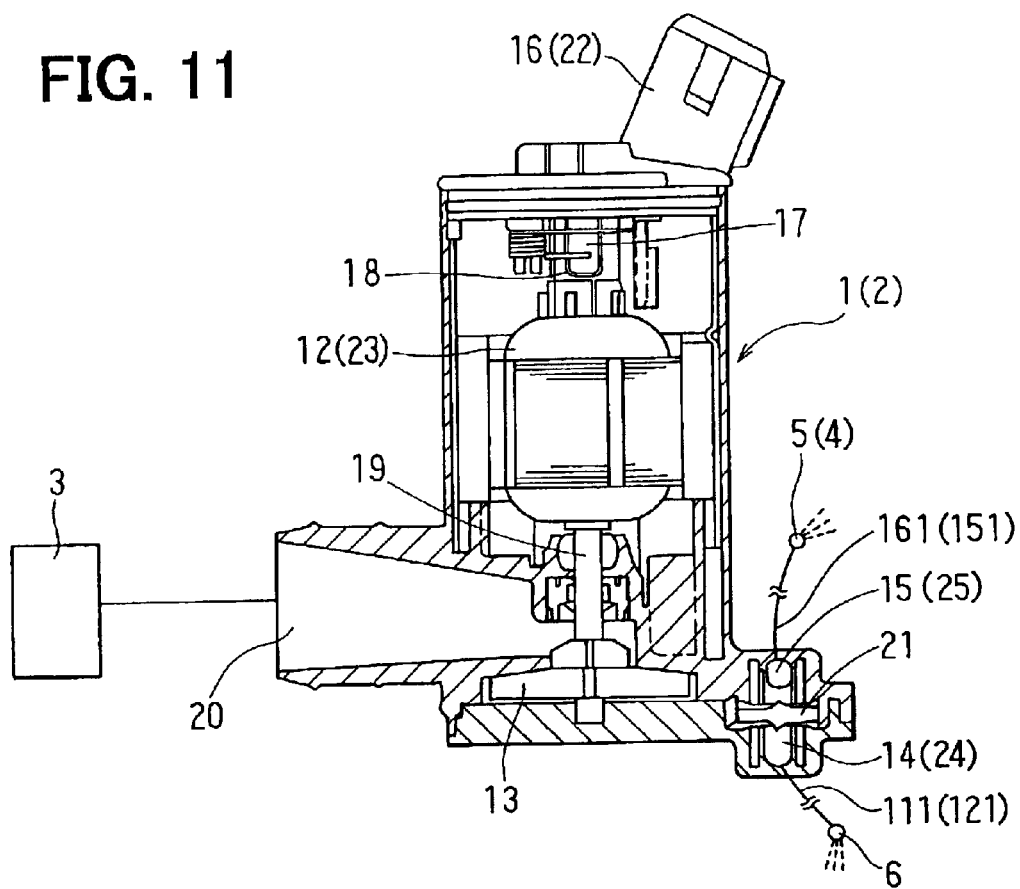
FIG. 11 is a cross-sectional view of a compact pump of the second or third embodiment.

With reference to FIGS. 8 and 11, the controller 7 is connected to a connector 16 of the compact pump 1 through an electrical line 171 and is also connected to a connector 22 of the compact pump 2 through an electrical line 172. When a corresponding switch (not shown) is operated by a driver, a headlamp cleaning liquid supply mode for supplying the cleaning liquid to headlamps 9, a front glass cleaning liquid supply mode for supplying the cleaning liquid to a front glass 8, or a rear glass cleaning liquid supply mode for supplying the cleaning liquid to a rear glass 10 is selected.

The tank 3 is secured to a vehicle body and receives cleaning liquid to be discharged from the headlamp nozzles 6, the front nozzles 4 and the rear nozzle 5. An inlet opening 20 of the compact pump 1 is inserted and secured in the tank 3 near a base of the tank 3 through a seal member, such as a grommet.

The controller 7 is connected to the connector 16 of the compact pump 1 through the electrical line 171, and a motor 12 of the compact pump 1 is controlled by the controller 7 to rotate in a normal direction or a reverse direction upon supply of electric power to a winding of the motor 12 from brushes 17 through a commutator 18. In the compact pump 1, when the motor 12 is rotated, an impeller 13 secured to a motor drive shaft 19 is rotated in the normal direction or the reverse direction, so that the cleaning liquid received in the tank 3 is suctioned through the inlet opening 20.

When the impeller 13 is rotated in the normal direction, the suctioned cleaning liquid is pressurized by the impeller 13 to increase a discharge pressure of the cleaning liquid. The increased discharge pressure of the cleaning liquid causes a float valve 21 to close a second outlet opening 15, so that the cleaning liquid is discharged to a hose 111 through a first outlet opening 14.

On the other hand, when the impeller 13 is rotated in the reverse direction, the cleaning liquid, which is pressurized by the impeller 13, causes the float valve 21 to close the first outlet opening 14, so that the cleaning liquid is discharged to a hose 161 through the second outlet opening 15.

As described above, in the compact pump 1, the operational direction of the float valve 21 is changed by the discharge pressure based on the rotational direction of the motor 12 to switch the outlet of the compact pump 1 between the first outlet opening 14 and the second outlet opening 15.

Next, the compact pump 2 will be described. With reference to FIG. 8, the compact pump 2 is secured to the vehicle body at a point between the tank 3 and the headlamp nozzles 6. A structure and specification of the compact pump 2 are substantially the same as those of the compact pump 1, so that details of the compact pump 2 will not be described for the sake of simplicity.

When a motor 23 of the compact pump 2 is rotated by the controller 7 in the normal direction, the cleaning liquid, which is discharged from the compact pump 1 through the first outlet opening 14 of the compact pump 1, is supplied to the compact pump 2 through the hose 111 and the inlet opening 20 of the compact pump 2 and is further pressurized in the compact pump 2. The pressurized cleaning liquid is discharged to a hose 121 from the compact pump 2 through a first outlet opening 24 of the compact pump 2. On the other hand, when the motor 23 of the compact pump 2 is rotated in the reverse direction, the cleaning liquid, which is discharged from the compact pump 1 and is supplied to the compact pump 2, is further pressurized in the compact pump 2 and is discharged to a hose 151 from the compact pump 2 through a second outlet opening 25 of the compact pump 2.

The cleaning liquid, which is pressurized by the compact pump 2 and is discharged to the hose 121, is passed through, for example, a Y-joint and is divided into two flows, which are then supplied to the left and right headlamp nozzles 6. Then, the cleaning liquid is discharged from each headlamp nozzle 6 toward a corresponding point of the corresponding headlamp 9. On the other hand, the cleaning liquid, which is pressurized by the compact pump 2 and is discharged to the hose 151, is supplied to the front nozzles 4. Then, the cleaning liquid is discharged from each front nozzle 4 toward corresponding point of the front glass 8. Furthermore, the cleaning liquid, which is discharged from the outlet opening 15 of the compact pump 1 to the hose 161, is discharged from the rear nozzle 5 toward the corresponding point of the rear glass 10 without being pressurized by the compact pump 2.

Figure 9:
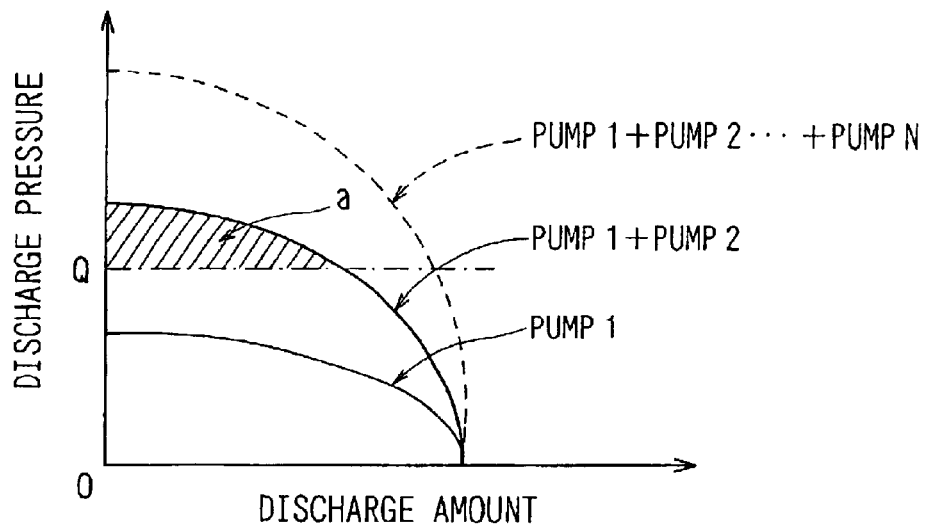
FIG. 9 is a graph showing a relationship between a discharge amount and a discharge pressure in each of various pump configurations.

As described above, the cleaning liquid supply system of the second embodiment includes the compact pump (washer pump) 1, which is relatively compact, light weight and versatile, and the compact pump (washer pump) 2, which is relatively compact, light weight and versatile like the compact pump 1. The compact pump 1 and the compact pump 2 are connected in series, so that the cleaning liquid, which is pressurized by the compact pump 1, is further pressurized by the compact pump 2. FIG. 9 shows a relationship between a discharge pressure and a discharge amount. As shown in FIG. 9, when the compact pump 1 and the compact pump 2, which are substantially identical to each other, are connected in series, the discharge pressure is doubled in comparison to the discharge pressure achieved only by the compact pump 1.

In this way, with reference to FIG. 9, in the case of discharging the cleaning liquid to the headlamps 9, it is possible to achieve a pressure of a characteristic region "a" (a shaded region in FIG. 9), which is equal to or greater than a required discharge pressure Q that is required for cleaning of the headlamps and cannot be achieved by the first compact pump (washer pump) 1 alone. Thus, without using the relatively large dedicated pump like in the previously proposed case, the cleaning liquid supply system of the second embodiment can be constructed using the relatively compact, light weight and versatile pumps similar to the washer pumps for cleaning the front glass and/or rear glass in the previously proposed case. As a result, the cleaning liquid supply system of the second embodiment can be constructed at the relatively low cost.

Furthermore, in the cleaning liquid supply system according to the second embodiment, the cleaning liquid to be supplied to the front glass 8 is pressurized by the compact pump 2 after the cleaning liquid is pressurized by the compact pump 1. Thus, the cleaning liquid of the relatively high discharge pressure is discharged to the front glass 8 from the front nozzles 4. In this way, the cleaning liquid, which is discharged from each front nozzle 4 of the high speed traveling vehicle toward the front glass 8 of the vehicle, is less likely deflected by a corresponding wind pressure applied to the traveling vehicle, so that the cleaning liquid can be discharged to the corresponding appropriate point on the front glass 8.

In the cleaning liquid supply system according to the second embodiment, since the rear nozzle 5 is installed to a rear side of the vehicle, the supply of the cleaning liquid to the rear glass 10 is less likely directly affected by the surrounding environment, such as by the wind pressure of the high speed traveling vehicle in comparison to the front glass. Thus, the cleaning liquid, which is supplied from the single compact pump at the relatively high discharge pressure and at the relatively large discharge amount through the rear nozzle 5, can be discharged to the corresponding appropriate point on the rear glass 10.

(Third Embodiment)

A cleaning liquid supply system according to a third embodiment of the present invention will be described with reference to FIGS. 9, 10 and 12.

Figure 12:
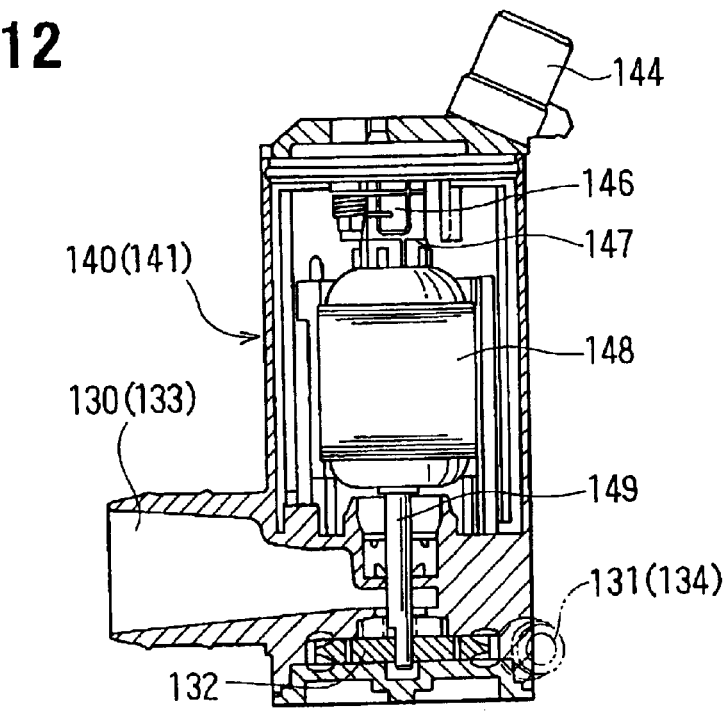
FIG. 12 is a cross-sectional view of a compact pump of the third embodiment.

As shown in FIG. 12, a motor 148 of a compact pump 140 rotates only in one direction. The controller 7 is connected to a connector 144 of the compact pump 140 through an electrical line 173, and the motor 148 of the compact pump 140 is controlled by the controller 7 to rotate only in the one direction upon supply of electric power to a winding of the motor 148 from brushes 146 through a commutator 147. In the compact pump 140, when the motor 148 is rotated, an impeller 132 secured to a motor drive shaft 149 is rotated in the one direction, so that the cleaning liquid received in the tank 3 is suctioned through an inlet opening 130. Then, the suctioned cleaning liquid is pressurized by the impeller 132 to increase the discharge pressure and is then discharged from the compact pump 140 to a hose 142 through an outlet opening 131.

Furthermore, a compact pump 141 is secured to the vehicle body at a point between the tank 3 and the headlamp nozzles 6. A structure and specification of the compact pump 141 is substantially the same as those of the compact pump 140, so that details of the compact pump 141 will not be described for the sake of simplicity.

The cleaning liquid, which is pressurized by the compact pump 140 and is discharged to a hose 142 from the compact pump 140 through the outlet opening 131 of the compact pump 140, is supplied to the compact pump 141 through an inlet opening 133 of the compact pump 141. Then, the cleaning liquid is further pressurized by the compact pump 141 and is discharged from the compact pump 141 to a hose 143 through an outlet opening 134 of the compact pump 141. Thereafter, the discharged cleaning liquid in the hose 143 is divided into two flows, which are then supplied to the left and right headlamp nozzles 6. Then, the cleaning liquid is discharged from each headlamp nozzle 6 to a corresponding appropriate point of the corresponding headlamp 9.

Figure 10:
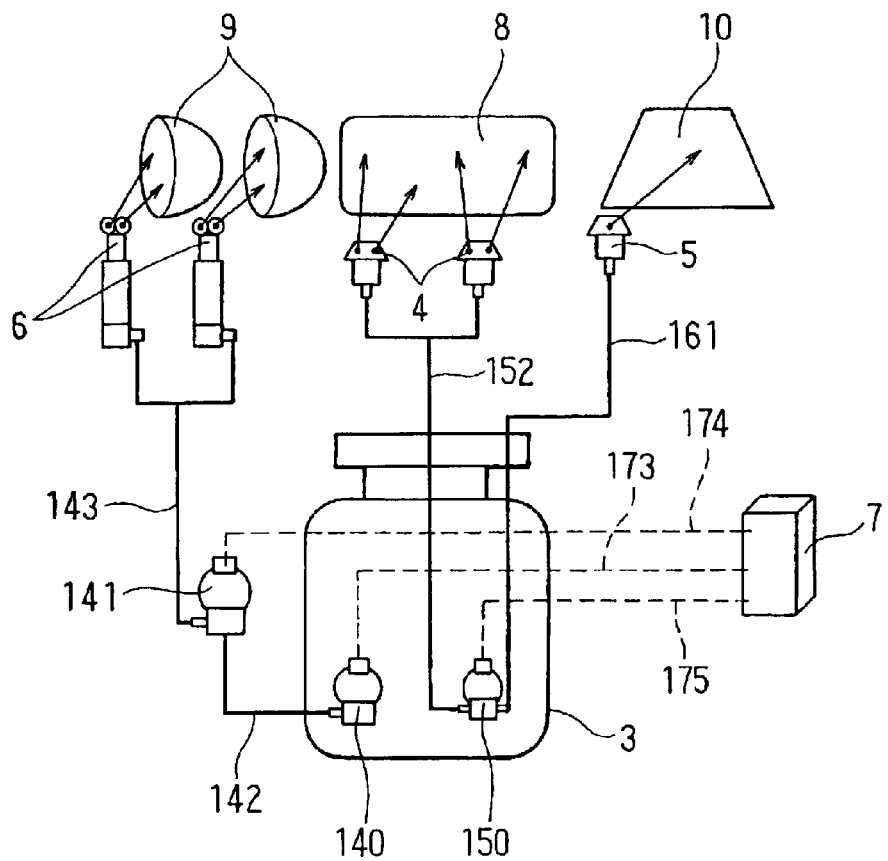
FIG. 10 is a schematic view showing an entire structure of a cleaning liquid supply system according to a third embodiment of the present invention.

Furthermore, as shown in FIG. 10, another compact pump 150 is provided. A structure and specification of the compact pump 150 are substantially the same as those of the compact pump 1 of the second embodiment shown in FIG. 11, so that details of the compact pump 150 will not be described for the sake of simplicity. The compact pumps 140, 141, 150 serve as a pump apparatus of the present invention.

An inlet opening 20 of the compact pump 150 is inserted and secured in the tank 3 near the base of the tank 3 through a seal member, such as a grommet. When a motor 12 of the compact pump 150 is rotated by the controller 7 in the normal direction, the cleaning liquid is pressurized by the compact pump 150 and is discharged from the compact pump 150 to a hose 152 through an outlet opening 14 of the compact pump 150. The discharged cleaning liquid in the hose 152 is supplied to the left and right front nozzles 4 and is discharged from each front nozzle 4 to the corresponding appropriate point on the front glass 8.

On the other hand, when the motor 12 of the compact pump 150 is rotated in the reverse direction by the controller 7, the cleaning liquid, which is pressurized by the compact pump 150, is discharged from the compact pump 150 to a hose 161 through an outlet opening 15 of the compact pump 150. Then, the discharged cleaning liquid in the hose 161 is supplied to the rear nozzle 5 and is discharged from the rear nozzle 5 toward the corresponding appropriate point on the rear glass 10.

As described above, the cleaning liquid supply system according to the third embodiment includes the compact pump (i.e., the simple washer pump rotating only in one direction and having only one outlet opening) 140, which is relatively compact, light weight and versatile, and the compact pump 141, which is similar to the compact pump 140. The compact pump 140 and the compact pump 141 are connected in series, so that the cleaning liquid pressurized by the compact pump 140 is further pressurized by the compact pump 141. In this case, a relationship between a discharge pressure and a discharge amount is similar to the one shown in FIG. 9. That is, when the compact pump 140 and the compact pump 141 are connected in series, the discharge pressure is doubled in comparison to a discharge pressure of the compact pump 140.

In this way, with reference to FIG. 9, in the case of discharging the cleaning liquid to the headlamps 9, it is possible to achieve the pressure of the characteristic region "a" (the shaded region in FIG. 9), which is equal to or greater than the required discharge pressure Q that is required for cleaning of the headlamps and cannot be achieved by the first compact pump (washer pump) 140 alone.

Thus, without using the relatively large dedicated pump like in the previously proposed case, the cleaning liquid supply system of the present embodiment can be constructed using the relatively compact, light weight and versatile pumps similar to the washer pumps for cleaning the front glass and/or rear glass in the previously proposed case. As a result, the cleaning liquid supply system of the third embodiment can be constructed at the relatively low cost.

Furthermore, unlike the cleaning liquid supply system of the second embodiment, in the cleaning liquid supply system of the third embodiment, the cleaning liquid supply line, which supplies the cleaning liquid to the headlamps, and the cleaning liquid supply line, which supplies the cleaning liquid to the front glass and rear glass, are separated from each other. The cleaning liquid supply line, which supplies the cleaning liquid to the headlamps, includes the compact pumps 140, 141, and the cleaning liquid supply line, which supplies the cleaning liquid to the front glass and rear glass, includes the compact pump 150. With this arrangement, the discharge of the cleaning liquid to the headlamps and the discharge of the cleaning liquid to the front glass or rear glass can be simultaneously performed. Thus, for example, when the vehicle is running on a muddy road at night and thus receives splashes of muddy water, it is required to immediately provide a clear front view and bright front light. In such a case, the cleaning liquid can be simultaneously discharged to the headlamps and the front glass.

In each of the above embodiments, the two compact pumps are connected in series to increase the discharge pressure. The present invention is not limited to this arrangement. For example, more than two compact pumps can be connected in series. In such a case, when a number of the compact pumps is "N", the discharge pressure will be increased and will be proportional to the number "N" of the compact pumps (i.e., compact pump 1+ compact pump 2 . . . + compact pump N).

Additional advantages and modifications will readily occur to those skilled in the art. The invention in its broader terms is therefore, not limited to the specific details, representative apparatus, and illustrative examples shown and described.

What is claimed is:

1. A cleaning liquid supply system for a vehicle, the cleaning liquid supply system comprising:
   a tank, which stores cleaning liquid;
   a headlamp nozzle, which receives the cleaning liquid from the tank and discharges the cleaning liquid to a corresponding headlamp of the vehicle; and
   a pump apparatus, which is connected to the tank and the headlamp nozzle and pumps the cleaning liquid supplied from the tank to the headlamp nozzle, wherein:
   the headlamp nozzle includes a supply opening, through which the cleaning liquid is supplied to the headlamp nozzle from the pump apparatus;
   the pump apparatus includes:
   a first compact pump, which includes an inlet opening for taking the cleaning liquid and at least one outlet opening for discharging the cleaning liquid; and
   a second compact pump, which includes an inlet opening for taking the cleaning liquid and at least one outlet opening for discharging the cleaning liquid, wherein one of the at least one outlet opening of the first compact pump and one of the at least one outlet opening of the second compact pump are communicated with the supply opening of the headlamp nozzle such that the cleaning liquid discharged from the one of the at least one outlet opening of the first compact pump is supplied to the supply opening of the headlamp nozzle, and the cleaning liquid discharged from the one of the at least one outlet opening of the second compact pump is supplied to the supply opening of the headlamp nozzle.

2. A cleaning liquid supply system according to claim 1, further comprising a front nozzle connected to the pump apparatus, wherein:
   the front nozzle receives the cleaning liquid from the tank through the pump apparatus and discharges the cleaning liquid to a front glass of the vehicle;
   the at least one outlet opening of the first compact pump includes:
   a first outlet opening, which is connected to the front nozzle; and
   a second outlet opening, which is connected to the supply opening of the headlamp nozzle;
   the first compact pump is driven by a motor, which is rotatable in both a normal direction and a reverse direction; and
   the cleaning liquid is discharged from one of the first and second outlet openings of the first compact pump depending on a rotational direction of the motor of the first compact pump.

3. A cleaning liquid supply system according to claim 2, further comprising a rear nozzle connected to the pump apparatus, wherein:
   the rear nozzle receives the cleaning liquid from the tank through the pump apparatus and discharges the cleaning liquid to a rear glass of the vehicle;
   the at least one outlet opening of the second compact pump includes:
   a first outlet opening, which is connected to the rear nozzle; and
   a second outlet opening, which is connected to the supply opening of the headlamp nozzle;
   the second compact pump is driven by a motor, which is rotatable in both a normal direction and a reverse direction; and
   the cleaning liquid is discharged from one of the first and second outlet openings of the second compact pump depending on a rotational direction of the motor of the second compact pump.

4. A cleaning liquid supply system according to claim 1, wherein the first compact pump and the second compact pump are connected in series such that the one of the at least one outlet opening of the first compact pump is connected to the inlet opening of the second compact pump, and the one of the at least one outlet opening of the second compact pump is connected to the supply opening of the headlamp nozzle.

5. A cleaning liquid supply system according to claim 4, further comprising a front nozzle connected to the pump apparatus, wherein:
- the front nozzle receives the cleaning liquid from the tank through the pump apparatus and discharges the cleaning liquid to a front glass of the vehicle;
- the at least one outlet opening of the second compact pump includes:
  - a first outlet opening, which is connected to the supply opening of the headlamp nozzle; and
  - a second outlet opening, which is connected to the front nozzle;
- the second compact pump is driven by a motor, which is rotatable in both a normal direction and a reverse direction; and
- the cleaning liquid is discharged from one of the first and second outlet openings of the second compact pump depending on a rotational direction of the motor of the second compact pump.

6. A cleaning liquid supply system according to claim 5, further comprising a rear nozzle connected to the pump apparatus, wherein:
- the rear nozzle receives the cleaning liquid from the tank through the pump apparatus and discharges the cleaning liquid to a rear glass of the vehicle;
- the at least one outlet opening of the first compact pump includes:
  - a first outlet opening, which is connected to the inlet opening of the second compact pump; and
  - a second outlet opening, which is connected to the rear nozzle;
- the first compact pump is driven by a motor, which is rotatable in both a normal direction and a reverse direction; and
- the cleaning liquid is discharged from one of the first and second outlet openings of the first compact pump depending on a rotational direction of the motor of the first compact pump.

7. A cleaning liquid supply system according to claim 4, further comprising:
- a third compact pump, which includes an inlet opening, a first outlet opening and a second outlet opening, wherein:
  - the inlet opening of the third compact pump is connected to the tank;
  - the third compact pump is driven by a motor, which is rotatable in both a normal direction and a reverse direction; and
  - the cleaning liquid is discharged from one of the first and second outlet openings of the third compact pump depending on a rotational direction of the motor of the third compact pump;
- a front nozzle, which is connected to the first outlet opening of the third compact pump to receive (the cleaning liquid and discharges the cleaning liquid to a front glass of the vehicle; and
- a rear nozzle, which is connected to the second outlet opening of the third compact pump to receive the cleaning liquid and discharges the cleaning liquid to a rear glass of the vehicle.

* * * * *